US00RE37551E

(19) United States
(12) Reissued Patent
Shiki

(10) Patent Number: US RE37,551 E
(45) Date of Reissued Patent: Feb. 19, 2002

(54) DISPLAY CONTROLLER AND DISPLAY CONTROL METHOD FOR MULTISCAN LIQUID CRYSTAL DISPLAY

(75) Inventor: Tatsuya Shiki, Tokyo (JP)

(73) Assignee: NEC Corporation, Tokyo (JP)

(21) Appl. No.: 09/473,274

(22) Filed: Dec. 23, 1999

Related U.S. Patent Documents

Reissue of:
(64) Patent No.: 5,717,467
Issued: Feb. 10, 1998
Appl. No.: 08/524,624
Filed: Sep. 7, 1995

(30) Foreign Application Priority Data

Sep. 14, 1994 (JP) ..... 6-244858

(51) Int. Cl.[7] ..... H04N 7/00
(52) U.S. Cl. ..... 345/87; 348/554; 345/121; 345/127; 707/512
(58) Field of Search ..... 345/132, 121, 345/127, 3, 213, 98, 99, 100, 204; 348/511, 524, 554–556, 558

(56) References Cited

U.S. PATENT DOCUMENTS

| | | | | |
|---|---|---|---|---|
| 4,701,796 A | * | 10/1987 | Kamiya | 358/154 |
| 4,736,162 A | * | 4/1988 | Ishihara | |
| 4,891,705 A | * | 1/1990 | Suzuki et al. | 358/148 |
| 5,021,719 A | | 6/1991 | Arai et al. | |
| 5,153,725 A | * | 10/1992 | Masaike | 358/153 |
| 5,245,431 A | * | 9/1993 | Okada et al. | 358/148 |
| 5,406,308 A | * | 4/1995 | Shiki | 345/127 |

FOREIGN PATENT DOCUMENTS

| | | |
|---|---|---|
| JP | 63-178961 | 11/1988 |
| JP | 2-170194 | 6/1990 |
| JP | 2-294688 | 12/1990 |
| JP | 3280084 | * 12/1991 |
| JP | 3-280084 | 12/1991 |
| JP | 3-280085 | 12/1991 |
| JP | 3280085 | * 12/1991 |
| JP | 4-124700 | 4/1992 |
| JP | 5-143026 | 6/1993 |
| JP | 5-70076 | 9/1993 |
| JP | 6-6835 | 1/1994 |
| JP | 6230739 | 8/1994 |

* cited by examiner

*Primary Examiner*—Regina Liang
(74) *Attorney, Agent, or Firm*—Foley & Lardner

(57) ABSTRACT

A display controller including a frequency discriminator for attaining modes of horizontal and vertical frequencies of video signals inputted thereto according to horizontal and vertical sync signals, a memory for setting therein a screen mode matching the input video signals according to the determined frequency modes, and a horizontal timing signal generator and a vertical timing signal generator capable of arbitrarily setting horizontal and vertical display positions of the video signals. Obtaining the horizontal and vertical frequencies of the video signals, the controller conducts a control operation to generate horizontal and vertical timing signals associated with the horizontal and vertical frequencies. Even when the number of dots of the LCD panel is different from the number of dots supplied during a video display period from the input video signals, the resultant image can be presented in the central screen portion of the LCD panel.

25 Claims, 10 Drawing Sheets

PRIOR ART (AMENDED)

FIG. 2

PRIOR ART

| POLARITY OF VERTICAL SYNC SIGNAL | POLARITY OF HORIZONTAL SYNC SIGNAL | SCREEN MODE |
|---|---|---|
| NEGATIVE | NEGATIVE | A MODE |
| NEGATIVE | POSITIVE | B MODE |
| POSITIVE | NEGATIVE | C MODE |
| POSITIVE | POSITIVE | D MODE |

(AMENDED)

FIG. 4

PRIOR ART

| RESULT OF DISCRIMINATION OF RELATIONSHIP BETWEEN HORIZONTAL AND VERTICAL SYNC SIGNALS | SCREEN MODE |
|---|---|
| COUNT "3" | A MODE |
| COUNT "2" | B MODE |
| COUNT "1" | C MODE |
| COUNT "0" | D MODE |

FIG. 10

| ADDRESS DATA | | DATA |
|---|---|---|
| HIGH-ORDER BITS (RESULT FROM VERTICAL FREQUENCY DISCRIMINATOR) | LOW-ORDER BITS (RESULT FROM HORIZONTAL FREQUENCY DISCRIMINATOR) | |
| 01H | 03H | 7C21H |
| 01H | 03H | 7C22H |
| ⋮ | ⋮ | ⋮ |

(DATA IS EXPRESSED IN HEXADECIMAL NOTATION IN THIS TABLE. AN ASTERISK (*) INDICATES THAT THE ASSOCIATED ITEM INCLUDES A PLURALITY OF BITS (E.G., EIGHT BITS))

DISPLAY CONTROLLER AND DISPLAY CONTROL METHOD FOR MULTISCAN LIQUID CRYSTAL DISPLAY

Matter enclosed in heavy brackets [ ] appears in the original patent but forms no part of this reissue specification; matter printed in italics indicates the additions made by reissue.

BACKGROUND OF THE INVENTION

The present invention relates to a liquid crystal display and, in particular, to a display and a display method in which video signals of a plurality of signal standards can be displayed in a similar manner as for multiscan-type displays.

DESCRIPTION OF THE RELATED ART

Recently, liquid crystal displays having features such as decreased thickness, lower-voltage operation, and reduced power consumption have been practically applied in place of cathode-ray tube (CRT) displays to personal computers, word processors, color television sets, etc.

A multiscan-type or multisync-type display is a display configured to present images in a plurality of resolutions by a multiscan function (i.e., an automatic frequency follow-up function with synchronization set to various kinds of signals). For example, video signals having resolutions of 640×400, 640×480, 1024×768, and 1120×750 dots can be displayed as images on a screen of one display. In this connection, "MULTISYNC" is a registered trademark of NEC HOME ELECTRONICS (U.S.A.) INC. in accordance with the U.S. trademark registered No. 1,443,951.

Conventionally, when handling input signals of a plurality of signal standards by one liquid crystal display (LCD), there is conducted correction of display positions for fear of positional difference in the vertical and horizontal directions associated with input signals. For example, a control circuit for use with a liquid crystal display has been described in the Japanese Patent Laid-Open Publication No. Hei-3-280084 as shown in FIG. 1.

Referring to FIG. 1, the conventional liquid crystal display controller disclosed by the Japanese Patent Laid-Open Publication No. Hei-3-280084 (to be referred to as conventional example 1 herebelow) includes a vertical synchronization (sync) signal discriminator 71, a horizontal sync signal discriminator 72, a screen mode storage circuit 73, a logical converter for horizontal and vertical sync signals 74, and a liquid crystal controller 75. The vertical sync signal discriminator 71 includes a frequency divider 76 and a latch circuit 77, whereas the horizontal sync signal discriminator 72 includes a divider 78 and a latch circuit 79.

Next, description will be given of operation of the conventional liquid crystal display controller shown in FIG. 1.

A vertical sync signal VS and a horizontal sync signal HS supplied to the controller are fed respectively to the vertical sync signal discriminator 71 and the horizontal sync signal discriminator 72 [for decision of] *to determine the* polarity of each sync signal. For example, when the discriminator 71 or 72 produces a high-level signal, the associated sync signal is assumed to be positive; conversely, when the discriminator 71 or 72 produces a low-level signal, the associated sync signal is assumed to be negative.

Subsequently, the signals created from the discriminating circuits 71 and 72 are delivered to the screen mode storage 73 in the next stage to be supplied therefrom to the logical converter for horizontal and vertical sync signals 74 and liquid crystal controller 75. A horizontal sync signal HS and a vertical sync signal VS outputted from the converter 74 are set respectively to predetermined logical states through signal conversion regardless of a mode of screen operation.

On the other hand, in the liquid crystal controller 75, the received signals are processed for appropriate vertical and horizontal screen positions in each screen mode according to data from the screen mode memory 73. For example, when the horizontal and vertical sync signals HS and VS are assumed to be negative as shown in FIG. 2, the signal currently inputted thereto is judged to be in A mode and hence is automatically displayed in a central portion of the screen of the liquid crystal panel.

In the control operation above, according to the signals obtained by respectively judging the horizontal and vertical sync signals HS and VS, the image can be automatically displayed in the central portion of the screen.

Namely, it is possible to prevent the image from being presented in a portion shifted from the central portion in the screen of the liquid crystal panel.

However, in the method of the prior art, the control operation is accomplished according to two signals, i.e., horizontal and vertical sync signals HS and VS as described above, it is possible to cope with signals in only four modes.

Modifying a portion of the circuit configuration of conventional example 1, a liquid crystal display (LCD) controller of FIG. 3 has been proposed to appropriately correct the display position, for example, in the Japanese Patent Laid-Open Publication No. Hei-3-280085.

The LCD controller of FIG. 3 described in the Japanese Patent Laid-Open No. Hei-3-280085 (to be referred to as conventional example 2 herebelow) includes a vertical sync signal discriminator 81, a circuit to judge relationship between horizontal and vertical sync signals 82, a screen mode circuit 83, a logical converter for horizontal and vertical sync signals 84, and a liquid crystal controller 85.

The vertical sync signal discriminator 81 includes a counter circuit 86 and a latch circuit 87, whereas the relation discriminator 82 includes a delay circuit 88, a gate circuit 89, and a counter 90.

Operation of conventional example 2 will be now described.

A vertical sync signal VS and a horizontal sync signal HS inputted to the system are fed to the vertical sync signal discriminator 81 and the relationship discriminator 82.

The vertical sync signal discriminator 81 is [adopted] *adapted* to decide polarity of the vertical sync signal VS supplied to the system. The operation of the discriminator circuit 81 is the same as that of conventional example 1 and hence description thereof will be unnecessary.

Subsequently, description will be given of the relationship discriminator 82.

In the logical converter 84, the logical state of the vertical sync signal VS is inverted when necessary according to a signal produced from the vertical sync signal discriminator 81 such that a positive-logic vertical sync signal VS is fed to the delay circuit 88. In the delay circuit 88, the vertical sync signal VS is delayed such that a delay sync signal DVS is delivered to the gate circuit 89.

In the gate circuit 89, a logical product is created between the delayed vertical sync signal DVS and the horizontal sync signal HS to resultantly output a logical product signal DVH to the counter 90. In the counter 90, the logical product signal DVH is counted at timing synchronized with the vertical sync signal VS so as to send a resultant signal to the screen mode circuit 83.

In the circuit 83, the value obtained by counting the logical product signal DVH is transformed into a screen mode. For example, when the count of signal DVH is 3, A mode is assumed; whereas, when the count is 2, B mode is assumed as shown in FIG. 4.

When the screen mode is thus decided, a check is carried out to determine whether the horizontal sync signal HS is positive or negative. Consequently, an instruction is supplied to the logical converter 84 to convert the horizontal sync signal into, for example, a horizontal sync signal HS of the positive logic.

In the liquid crystal controller 85, according to data from the screen mode circuit 83 in the same fashion as for conventional example 1, the vertical and horizontal positions are processed in each screen mode. However, in conventional example 2, the screen mode is discriminated as shown in FIG. 10, which is different from the operation of conventional example 1.

In conventional example 2 described above, the [screeen] *screen* mode is automatically detected from the horizontal and vertical sync signals so that the horizontal and vertical positions are automatically set in the screen according to the detected screen mode. That is, the image is presented in the central portion of the screen in an automatic manner. Namely, it is possible to prevent the disadvantage that the image is displayed in a screen area displaced from the central portion.

However, also in the method of example 2, since the control operation is carried out according to two signals, namely, the horizontal and vertical sync signals, it is possible to process the video signals only in four modes like in example 1.

As described above, when handling input signals of plural kinds by one liquid crystal display in the prior art, there can be processed signals in at most four modes. Namely, the upper limit is four modes in the conventional method.

SUMMARY OF THE INVENTION

It is therefore an object of the present invention to solve the problem above and to provide a display controller and a display control method for a multiscan liquid crystal display in which even when input video signals of a plurality of signal standards (e.g., five or more kinds of input video signals) are processed by one liquid crystal display to be presented on a screen of an LCD panel thereof, the obtained image can be presented in a central portion of the screen of the LCD panel.

To [achive] *achieve* the object above in accordance with the present invention, there is provided a display controller of a multiscan LCD using an LCD panel including a frequency discriminator means for attaining a mode of horizontal frequency and a mode of vertical frequency of video [singnals] *signals* according to a horizontal sync signal, a vertical sync signal, and a clock signal inputted thereto; a memory circuit means for receiving as an input thereto data outputted from the frequency discriminator means and producing data matching a frequency inputted thereto, and a horizontal timing signal generator means and a vertical timing signal generator means responsive to data from the memory circuit means for arbitrarily setting timing of controlling a display position of the video signals on the LCD panel.

In accordance with the present invention, the frequency discriminator means includes a horizontal sync signal frequency discriminator means for receiving as inputs thereto the horizontal sync signal and the clock signal and a vertical sync signal frequency discriminator means for receiving as inputs thereto the vertical sync signal and the horizontal sync signal. The horizontal sync signal frequency discriminator means includes a pixel counting section including a counter for counting the clock signal for one horizontal period of the horizontal sync signal. The vertical sync signal frequency discriminator means includes a line counting section including a counter for counting the horizontal sync signal for one vertical period of the vertical sync signal.

The horizontal sync signal frequency discriminator means in accordance with the present invention may favorably include a decoder for decoding a horizontal mode according to a count value of the counter.

In accordance with the present invention, the vertical sync signal frequency discriminator means desirably includes a decoder means for decoding a vertical mode according to a counter value of the counter.

Moreover, in accordance with an aspect of the present invention, the horizontal timing generator means includes a fine adjuster circuit means for correcting control data outputted from a memory circuit means in the frequency discriminator means.

Additionally, the vertical timing generator means in accordance with the present invention includes a fine adjuster circuit means for correcting control data outputted from a memory circuit means in the frequency discriminator means.

In accordance with the present invention, the fine adjuster circuit means favorably includes a circuit for achieving an addition or a subtraction between a fine adjustment signal supplied from an external device and an output from the memory circuit means.

Furthermore, in accordance with the present invention, there is provided a display control method for use with a multiscan LCD using an LCD panel. The method includes the steps of attaining, according to a horizontal sync signal, a vertical sync signal, and a clock signal inputted thereto, a frequency mode of the horizontal frequency and a frequency mode of the vertical frequency of video signals; referencing a look-up table according to the frequency modes and obtaining data matching a frequency inputted thereto, and variably controlling, according to the data, generation of a horizontal timing signal and a vertical timing signal determining a display position of the video signals on the LCD panel.

In [accordancce] *accordance* with the present invention, when signals conforming to plural standards including, e.g., video graphics array (VGA) signals in which each array includes (horizontal) 640×(vertical) 480 pixels, extended graphic array (XGA) signals in which each array includes (horizontal) 1024×(vertical) 768 pixels, PC98 signals, and MACII signals are inputted to one liquid crystal display, the starting point of displaying a video image can be appropriately established according to a frequency mode obtained from the horizontal and vertical sync signals of the input signals. Consequently, even when the number of dots of the LCD panel of the display is different from that of input video signals for displaying the video image, the image can be presented in the central portion of the display panel.

Furthermore, in accordance with the present invention, a fine adjustment can be accomplished for the output phase by disposing a circuit to conduct, a fine adjustment between the memory circuit and the horizontal and vertical timing generators.

The display controller in accordance with the present invention can be added to the circuit configuration of the conventional LCD without any modifications thereof. This makes it possible to reduce the production cost of the multiscan LCD.

BRIEF DESCRIPTION OF THE DRAWINGS

The objects and features of the present invention will become more apparent from the consideration of the following detailed description taken in conjunction with the accompanying drawings in which:

FIG. 2 is a diagram for explaining an example of the method of deciding the screen mode in conventional example 1;

FIG. 4 is a diagram for explaining an example of the operation of determining the screen mode in conventional example 2;

FIG. 10 is a table showing an example of the contents of the memory circuit, namely, addresses and output data in the embodiment of the present invention.

DESCRIPTION OF THE PREFERRED EMBODIMENTS

Referring now to the accompanying drawings, description will be given in detail of an embodiment in accordance with the present invention.

Figure 1:
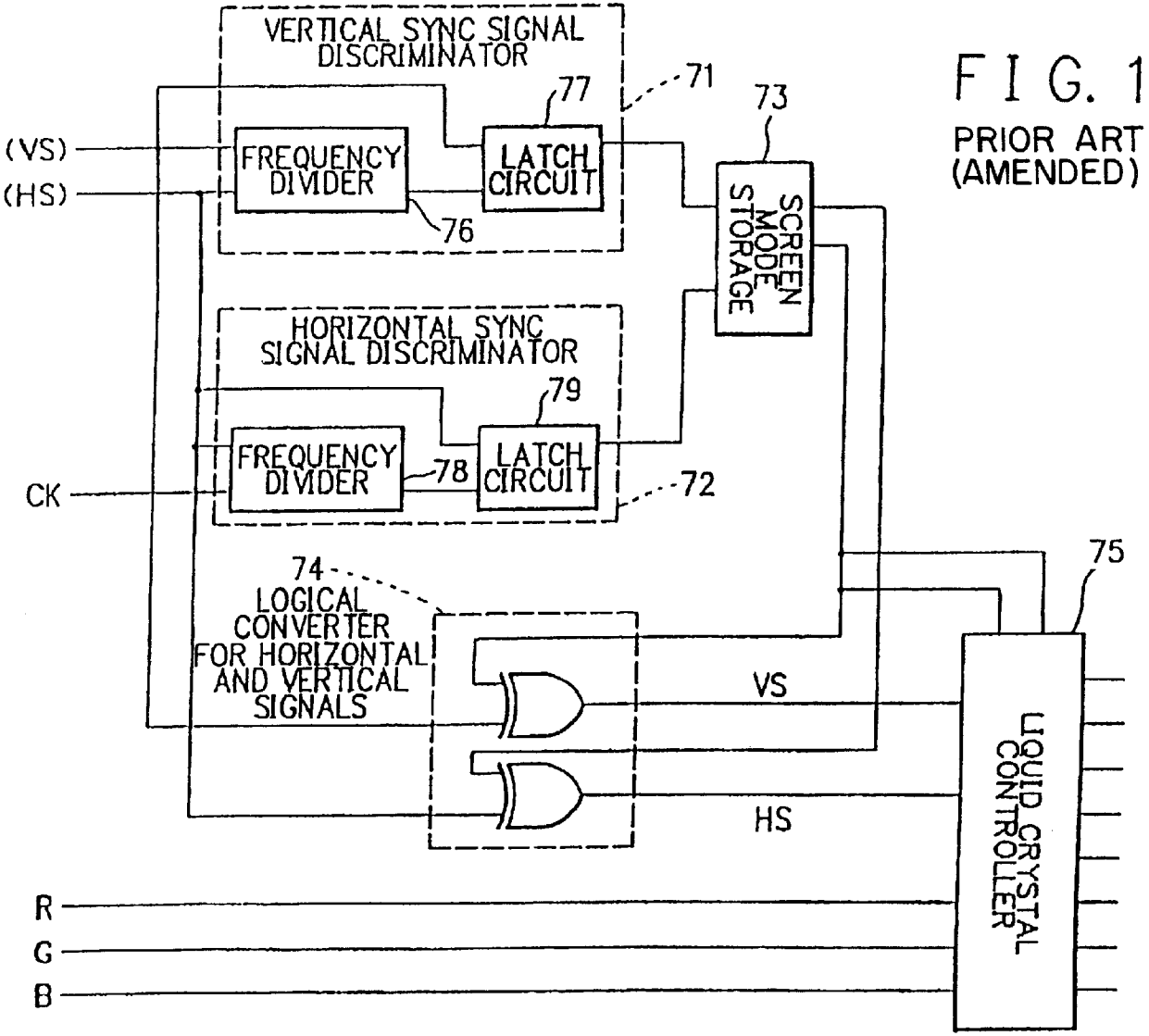
FIG. 1 is schematic diagram showing the configuration of a conventional LCD controller (conventional example 1)
Figure 3:
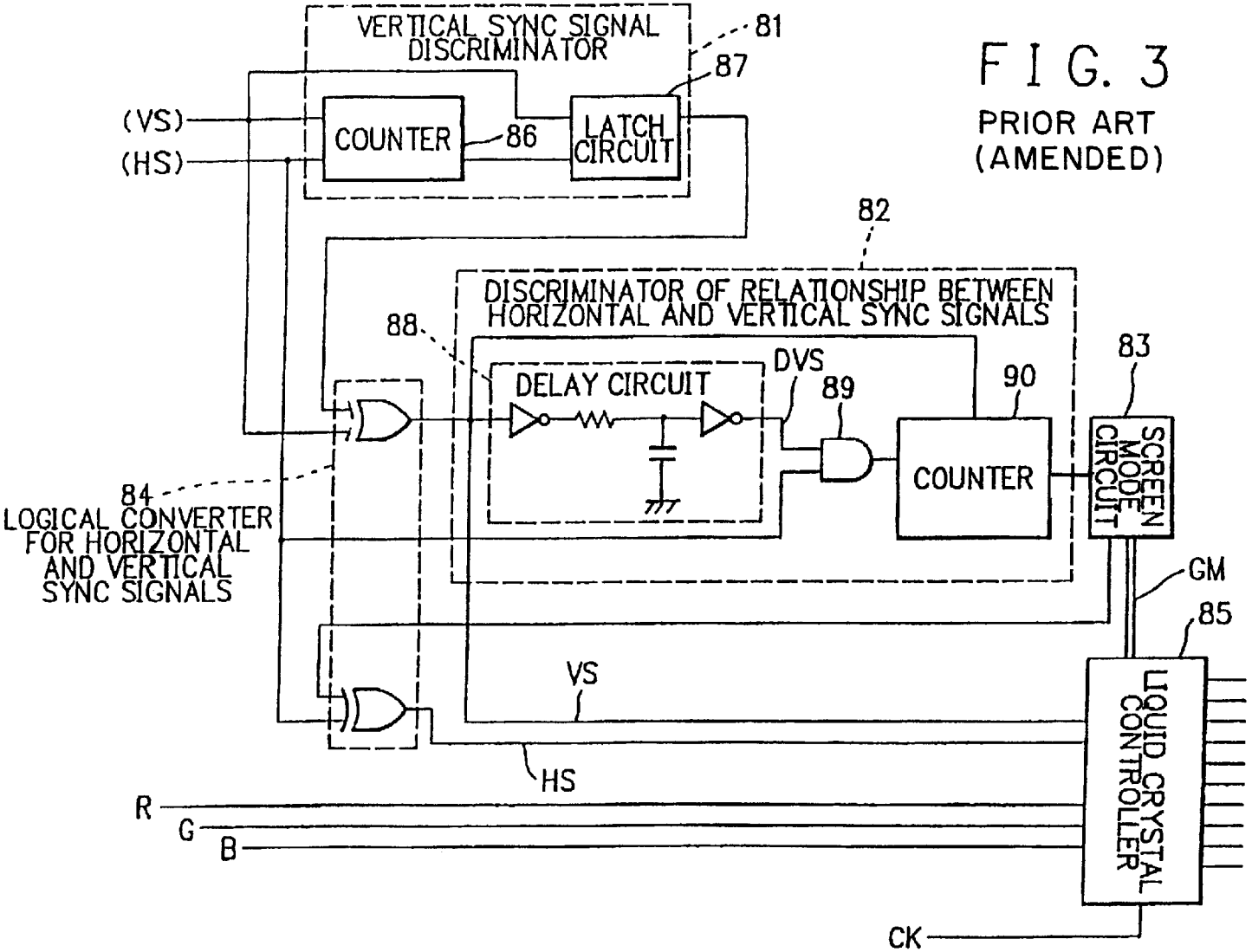
FIG. 3 PRIOR ART
FIG. 3 is a schematic diagram showing structure of a conventional LCD controller (conventional example 2)
Figure 5:
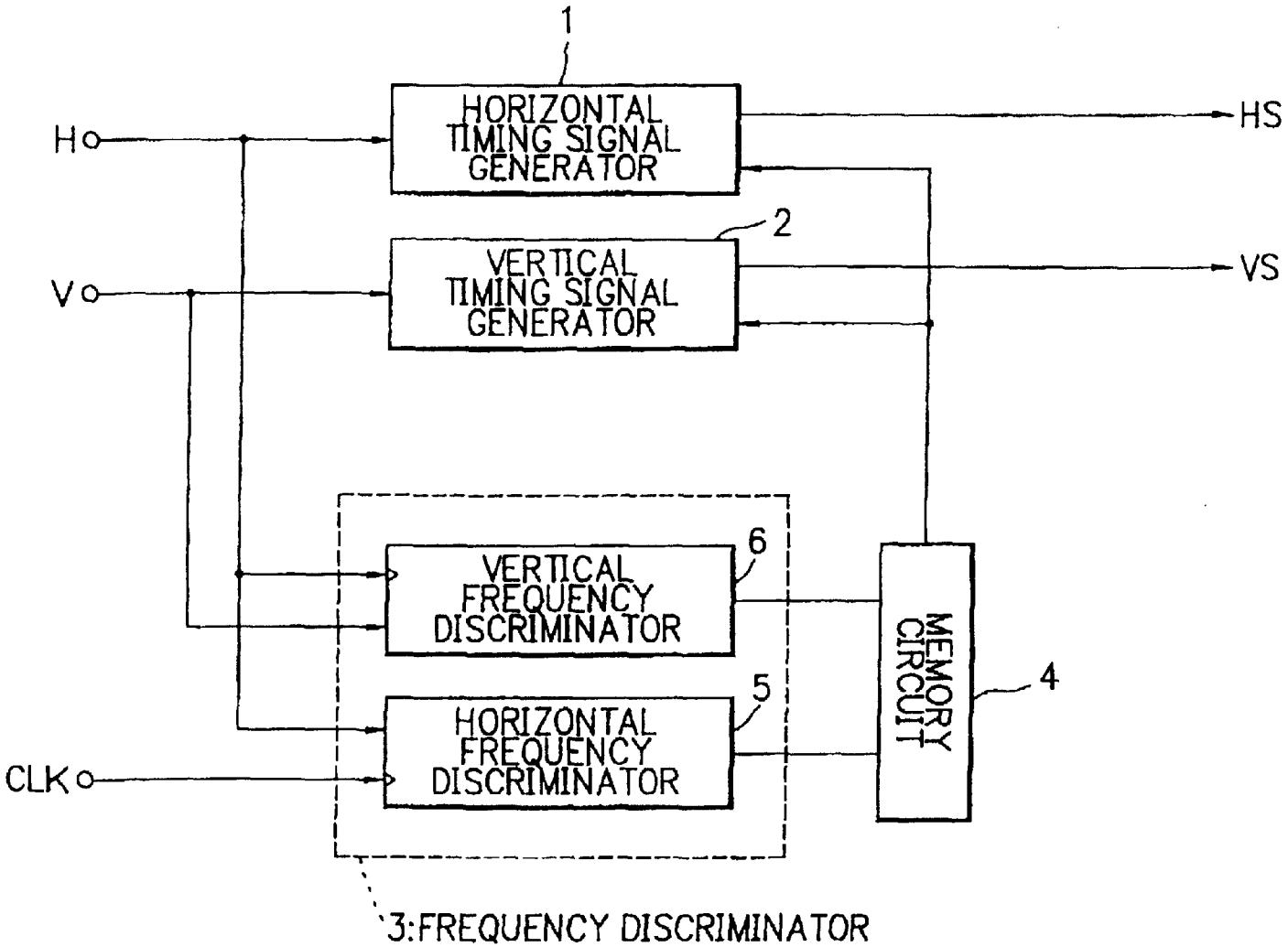
FIG. 5 is a block diagram showing the overall circuit construction of a first embodiment in accordance with the present invention.

FIG. 5 shows structure of a display controller of a multiscan liquid crystal display in an embodiment in accordance with the present invention.

The configuration of the embodiment of FIG. 5 includes a horizontal timing signal generator 1, a vertical timing signal generator 1, a frequency discriminator 3, and a memory circuit 4. The frequency discriminator 3 includes a horizontal frequency discriminator circuit 5 and a vertical frequency discriminator circuit 6. In the diagram, letters H, V, and CLK stand for a horizontal sync signal input terminal, a vertical sync signal input terminal, and a clock signal input terminal, respectively.

Figure 6:
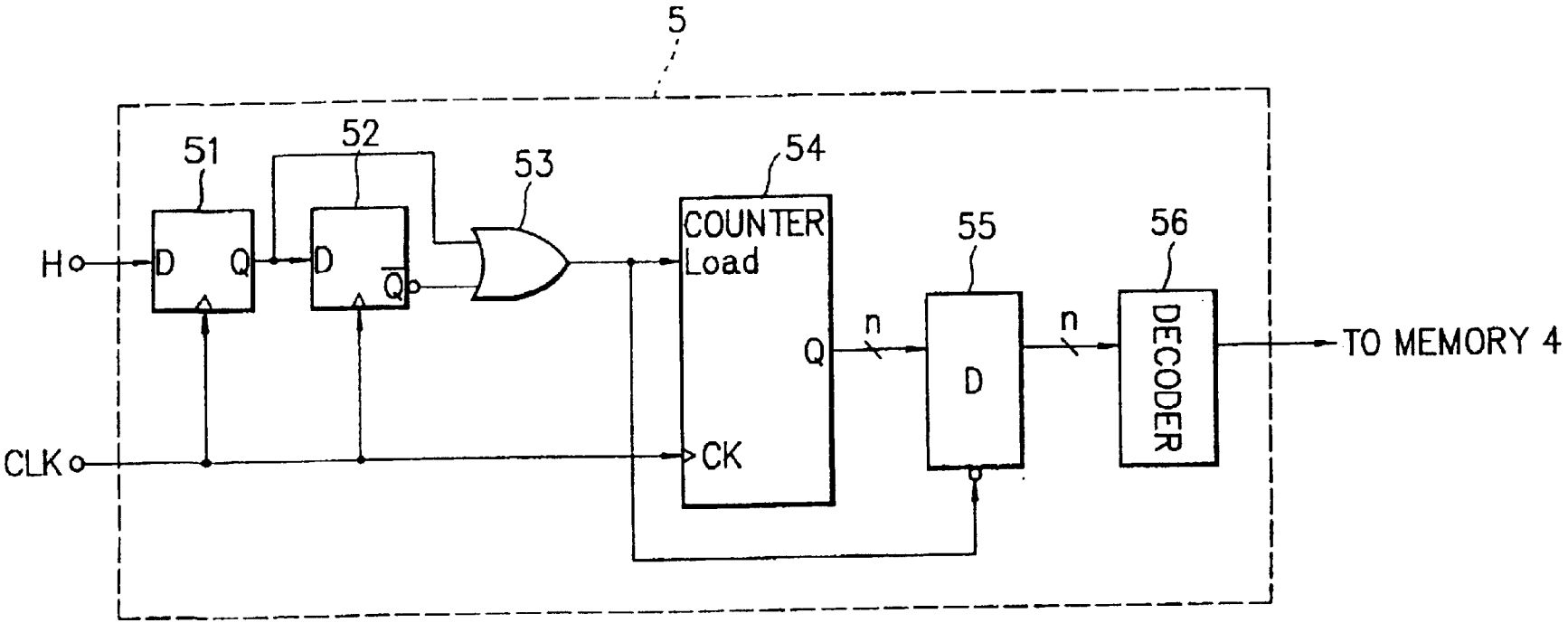
FIG. 6 is a block diagram showing details of a horizontal frequency discriminator 5 in the embodiment.
Figure 7:
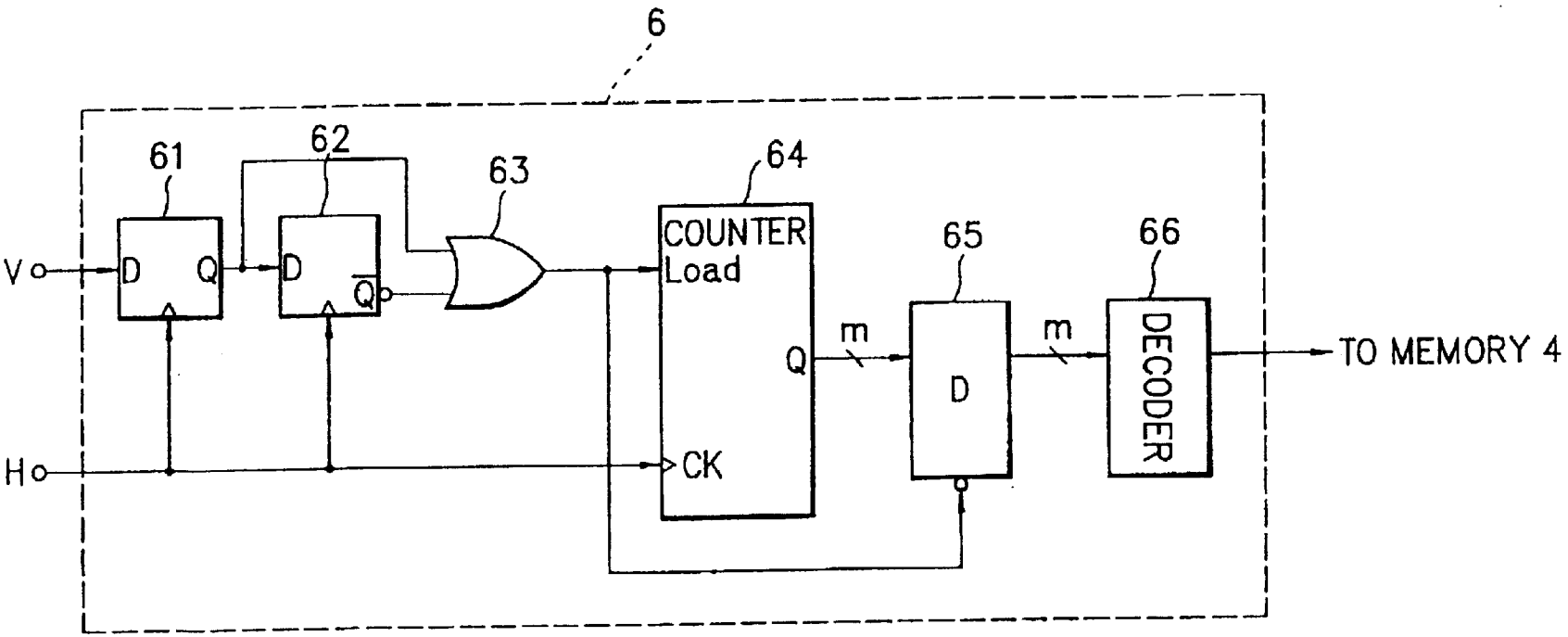
FIG. 7 is a block diagram showing details of a vertical frequency discriminator 6 in the embodiment.

FIGS. 6 and 7 respectively shows details respectively of the horizontal and vertical frequency discriminators 5 and 6 of the frequency discriminator 3.

Referring to FIG. 6, the horizontal frequency discriminator 5 includes D flip flop circuits 51 and 52, an OR gate circuit 53, a counter 54, a D flip flop circuit 55, and a decoder circuit 56. In the D flip flop circuit 55, a parallel output signal (an n-bit signal in FIG. 6) representing a count value from the counter 54 is received to be kept therein.

The vertical frequency discriminator 6 of FIG. 7 includes D flip flop circuits 61 and 62, an OR gate circuit 63, a counter 64, a D flip flop circuit 65, and a decoder 66. In the D flip flop circuit 65, a parallel output signal (a m-bit signal in FIG. 7) indicating a count value of the counter 64 is received to be memorized therein.

Next, operation of the embodiment will be described.

A horizontal sync signal H and a vertical sync signal V supplied thereto are fed to the horizontal and vertical timing signal generators 1 and 2 as well as the frequency discriminator 3 at the same time.

Also delivered to the frequency discriminator 3 is a clock signal CLK. In the discriminator 3, the input signal is judged as follows according to the received signals H, V, and CLK.

First, the horizontal frequency discriminator 5 will be described by referring to FIG. 6.

The clock signal CLK is fed to the clock input terminal of the counter 54 as shown in FIG. 6 such that the counting operation is accomplished during one horizontal (1 H) period. The D flip flop circuit is controlled to store therein the count value for the 1 H period.

That is, in FIG. 6, the horizontal sync signal H is supplied to the D flip flop circuit 51. An output signal Q from the circuit 51 is then fed to the D flip flop circuit 52 and a first input terminal of the OR gate circuit 53. Inputted to a second input terminal of the circuit 53 is an inverted output Q from the D flip flop circuit 52. An output signal from the OR gate circuit 53 is inputted to a Load terminal of the counter 54. Moreover, the output signal from the or gate circuit 53 is delivered as a latch timing (low active) signal to a control terminal of the D flip flop circuit 55. In the counter 54, when the Load terminal becomes active, the count value thereof is reset or cleared to zero and then there is commenced the operation to count the clock signal CLK inputted to the terminal CK. While the output from the OR circuit 53 is active (at a high level in FIG. 6), namely, during one 1 H period, the clock signal is counted such that when the signal from the OR gate circuit 53 is changed from the high level to the low level, the count operation is terminated and then the count value is fed from the counter 54 to the D flip flop circuit 55.

The circuit 55 is controlled to continuously output the count value memorized therein for the 1 H period to the decoder 56 in the subsequent stage.

In the decoder 56, the count value is compared with several mode values beforehand registered so as to set a bit associated with the mode value matching the count value. The resultant signal from the decoder 56 is outputted to the memory signal 4 of FIG. 5.

Referring now to FIG. 7, the vertical frequency discriminator 6 will be described. The input vertical sync signal H is fed to a clock input terminal of the counter 64 to conduct a count operation for one vertical period. The D flip flop circuit 65 is controlled to keep therein the count value for the vertical period.

That is, in FIG. 7, the vertical sync signal V is delivered to the D flip flop 61, which accordingly produces an output signal Q. The signal Q is supplied to the D flip flop circuit 62 and a first input terminal of the OR gate circuit 63. Inputted to a second input terminal of the circuit 63 is an inverted output signal Q from the D flip flop circuit 62. A resultant signal outputted from the OR gate circuit 63 is inputted to a Load terminal of the counter 64. Moreover, the signal from the OR gate circuit 63 is supplied as a latch timing (low active) signal to a control terminal of the D flip flop circuit 65. In the counter 64, when the load terminal becomes active, the internal count value is cleared to zero to start the count operation of the horizontal sync signal supplied to a terminal CK. During the signal from the OR gate circuit 63 is active (at a high level in FIG. 7), namely, during one vertical period, the horizontal sync signal H is counted. When the signal from the OR gate circuit 63 is altered from the high level to the low level, the count operation is stopped and then the count value is delivered from the counter 64 to the D flip flop 65.

Like in the horizontal frequency discriminator 5, the D flip flop circuit 65 is controlled to continuously output the first memorized count value to the decoder circuit 66 in the next stage.

In the circuit 66, the count value is compared with several mode values beforehand registered, thereby setting a bit related to the mode value matching the count value. The signal thus produced from the decoder 66 is fed to the memory circuit 4 of FIG. 5 in a manner similar to that of the horizontal frequency discriminator 5.

In the memory 4, control signals created respectively from the decoder circuits 56 and 66 in the preceding stages respectively of FIGS. 6 and 7 are delivered to an address input terminal of the memory circuit 4. In response thereto, as can be seen from FIG. 10, data beforehand stored in the memory 4 at addresses respectively associated therewith are read therefrom to be fed to the horizontal and vertical timing signal generators 1 and 2.

Referring to FIG. 10, for example, when the decoder 66 of the vertical frequency discriminator 6 outputs "$01_H$" (high-order bits in hexadecimal notation) and the decoder 56 of the horizontal frequency discriminator 5 outputs "$02_H$" (low-order bits in hexadecimal notation), "$0102_H$" (hexadecimal notation) is delivered to the memory 4 to be stored at the associated address. Supplied to the horizontal and vertical timing signal generators 1 and 2 is data of, for example "$7C21_H$" (hexadecimal notation).

In this regard, although the address data and output data respectively include 16 bits in the memory circuit 4, the bit configuration is selected only for simplicity of explanation. Furthermore, according to the output data (including 16 bits) from the memory 4, data of a predetermined bit width is allocated and supplied to each of the horizontal and vertical timing signal generators 1 and 2. The values of output data from the memory circuit 4 are substantially expressed in dots (pixels) and lines (scanning lines) in the horizontal and vertical directions, respectively. The memory 4 includes, for example, a read-only memory.

Figure 8A:
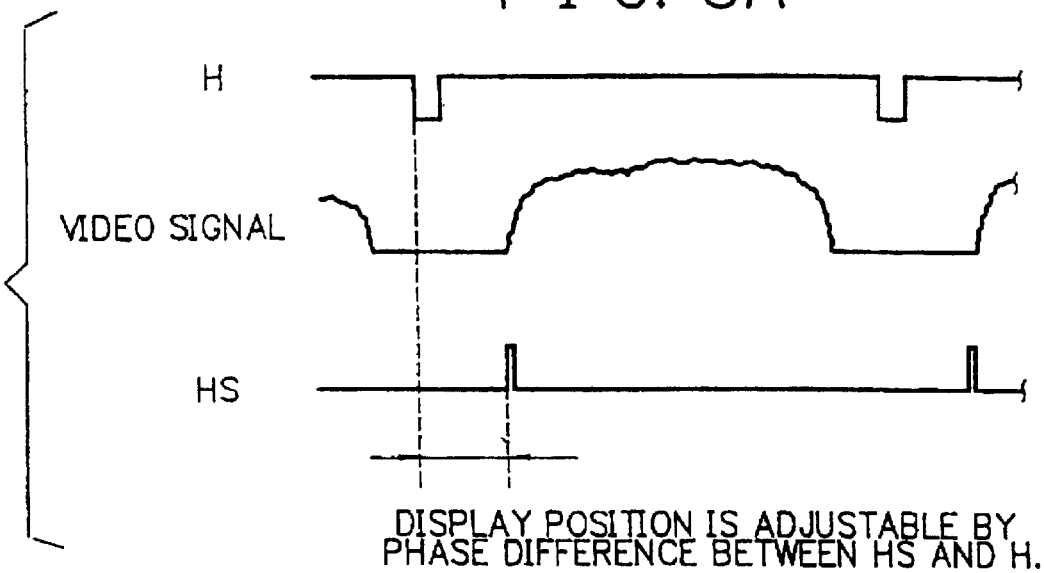
FIG. 8A is a signal timing chart showing a relationship in phase between an output signal HS and an input signal of a horizontal timing signal generator 1.

Subsequently, in the horizontal and vertical timing signal generators 1 and 2, operations are carried out as shown in FIG. 4 according to the data fed from the memory 4. FIG. 8A shows a relationship in phase between the input horizontal sync signal H, input video signal, and sync signal HS produced according to the embodiment; whereas, FIG. 8B shows a relationship in phase between the input vertical sync signal V, input video signal, and sync signal VS created in the embodiment.

Figure 8B:
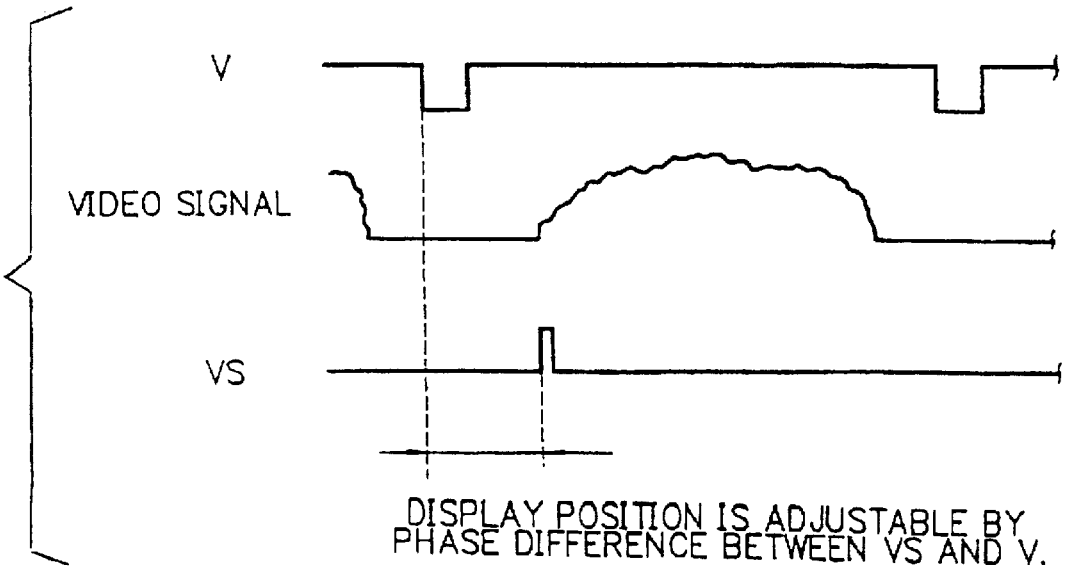
FIG. 8B is a signal timing chart showing a relationship in phase between an output signal VS and an input signal of a vertical timing signal generator 2.

As shown in FIGS. 8A and 8B, in response to the horizontal and vertical sync signals H and V inputted thereto, the system produces the sync signals HS and VS in a form matching the input mode by delaying the signals H and V by a period of time related to the value of data outputted from the memory 4. In other words, the display position (in the horizontal direction) is adjusted according to a phase difference [beteween] *between* the output signal HS and the horizontal sync signal H. Moreover, the vertical display position is regulated by a phase difference between the resultant sync signal VS and the input vertical sync signal V. In this connection, the horizontal and vertical timing signal generators 1 and 2 may be configured such that the horizontal and vertical sync signals H and V are delayed, according to the value of data from the memory 4, by a period of time equivalent to the data prepared by, for example, a down counter not shown.

Thanks to the operation of variably controlling the signals HS and VS generated respectively from the horizontal and vertical timing signal generators 1 and 2, it is guaranteed that the image is automatically presented in the central portion of the screen of the LCD panel. Namely, the image is not shifted from the center of the screen.

According to a variation of the embodiment, the decoder circuits 56 and 66 respectively of the horizontal and vertical frequency discriminators 5 and 6 may be dispensed with when the signals outputted from the D flip flop circuits 55 and 65 in the preceding stage are directly supplied as the address input signals to the memory 4 in the subsequent stage.

In this situation, the count values kept respectively in the counters 54 and 64 are fed to the address input terminal of the memory 4.

Next, description will be given of a second embodiment in accordance with the present invention.

When the display position is desired to be changed slightly in the horizontal and vertical directions in the first embodiment, namely, when the phase of output signals is desired to be changed for each of the horizontal and vertical timing signal generators 1 and 2, it is only necessary to additionally dispose a circuit to control operation as follows.

Figure 9:
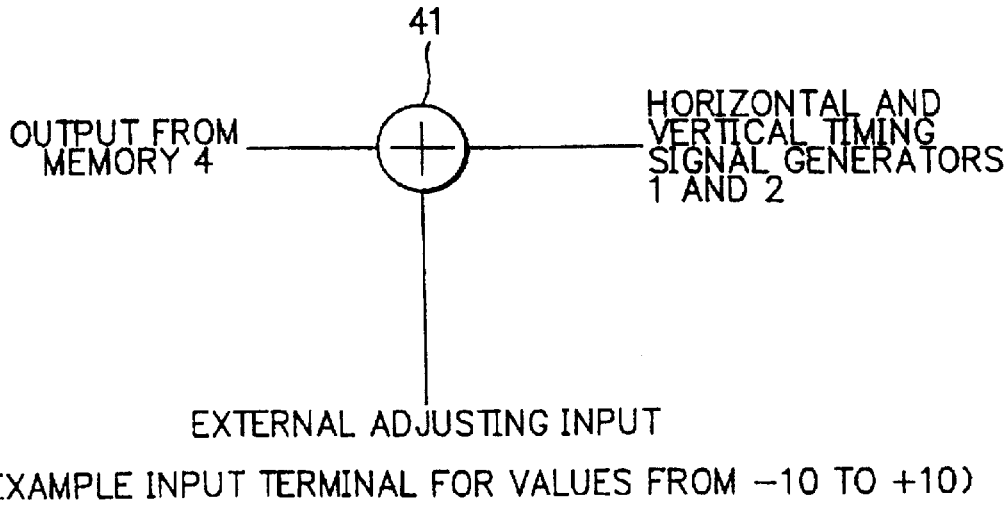
FIG. 9 is a block diagram of an additional circuit for an adjusting function in a second embodiment in accordance with the present invention.

In the second embodiment, an adder/subtracter circuit 41 shown in FIG. 9 is arranged between the memory 4 and the horizontal and vertical timing signal generators 1 and 2 in the succeeding stage of the memory circuit 4. In the adder/subtracter 41, the output from the memory 4 is added to or subtracted from a value supplied from an external adjusting input signal so as to output a result of the operation to the horizontal and vertical timing signal generators 1 and 2 in the succeeding stage.

The external adjusting input terminal is used to input data to conduct a fine positional adjustment when the image cannot be displayed at an appropriate [positon] *position* of the screen in the first embodiment. When such a fine adjustment is unnecessary, the input data is set to "0".

In the second embodiment, a fine positional adjustment can be accomplished by the adder/subtracter 41, for example, −3 or +2 is added to the data from the memory 4. Incidentally, the values are expressed in dots (pixels) and lines (scanning lines) in the horizontal and vertical directions, respectively.

As a result, it is possible to conduct a fine adjustment for the phases respectively of the output signals HS and VS from the horizontal and vertical timing signal generators 1 and 2 (FIG. 5) with respect to the video signal. Owing to the adjusting function, the second embodiment is suitable for a system configuration requiring adjustment of the image display position, for example, a system in which the video signals are processed in the form of analog signals.

Description has been given of the embodiments in accordance with the present invention. However, the present invention is not limited to the embodiments, but includes various embodying modes associated with the principle of the present invention. Particularly, the circuit constructions and various values referenced in the description of the embodiments are employed only to explain the present invention, and hence the present invention is not restricted by the circuit configurations.

In accordance with the present invention described above, even when signals of a plurality of standards such as VGA signals, XGA signals, PC98 signals, and MAC II signals are inputted to one liquid crystal display, the position to start displaying an image of the signals can be appropriately established according to the frequency modes determined from the horizontal and vertical sync signals of the input signals. Consequently, the image can be displayed in the [centeral] *central* screen portion of the LCD panel. The disadvantage that the image is shifted from the center of the screen can be prevented.

Moreover, in accordance with the present invention, the frequency discriminator to attain the horizontal and vertical frequency modes from the horizontal and vertical sync signals and clock signal inputted thereto includes simple circuits such as counters and control circuits related thereto. The apparatus of the present invention is implemented by adding a memory circuit thereto, which consequently reduces the circuit size and production cost of the apparatus.

Additionally, in accordance with the present invention, when a circuit [counducting] *conducting* a fine adjustment is disposed between the memory circuit and the horizontal and vertical timing circuit generators, there is achieved a display control operation capable of conducting a fine adjustment of phases of signals from the timing signal generators. Consequently, the present invention is particularly favorable for a system in which the video signals are treated in the analog form.

Furthermore, the display controller in accordance with the present invention can be added to the circuit structure of the conventional liquid crystal display, which resultantly minimizes the production cost of the multiscan liquid crystal display.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A display controller of a multiscan liquid crystal display (LCD) using an LCD panel, comprising:

frequency discriminator means for attaining a mode of horizontal frequency and a mode of vertical frequency of video signals according to a horizontal sync signal, a vertical sync signal, and a clock signal inputted thereto;

memory circuit means for receiving as an input thereto data outputted from the frequency discriminator means and producing data matching a frequency inputted thereto; and horizontal timing signal generator means and vertical timing signal generator means, responsive to data from the memory circuit means, for setting timing of controlling a display position of the video signals on the LCD panel.

2. A display controller of a multiscan LCD as claimed in claim 1, wherein the frequency discriminator means includes:

horizontal sync signal frequency discriminator means for receiving as inputs thereto the horizontal sync signal and the clock signal; and vertical sync signal frequency discriminator means for receiving as inputs thereto the vertical sync signal and the horizontal sync signal, the horizontal sync signal frequency discriminator means including a pixel counting section including a counter for counting the clock signal for one horizontal period of the horizontal sync signal, the vertical sync signal frequency discriminator means including a line counting section including a counter for counting the horizontal sync signal for one vertical period of the vertical sync signal.

3. A display controller of a multiscan LCD as claimed in claim 2, wherein the horizontal sync signal frequency discriminator means includes a decoder for decoding a horizontal mode according to a count value of the counter.

4. A display controller of a multiscan LCD as claimed in claim 2, wherein the vertical sync signal frequency discriminator means includes a decoder means for decoding a vertical mode according to a count value of the counter.

5. A display controller of a multiscan LCD as claimed in claim 1, wherein the horizontal timing generator means includes a fine adjuster circuit means for correcting control data outputted from a memory circuit means in the frequency discriminator means.

6. A display controller of a multiscan LCD as claimed in claim 1, wherein the vertical timing generator means includes fine adjuster circuit means for correcting control data outputted from a memory circuit means in the frequency discriminator means.

7. A display controller of a multiscan LCD as claimed in claim 5, wherein the fine adjuster circuit means includes a circuit for performing an addition or a subtraction between a fine adjustment signal supplied from an external device and an output from the memory circuit means.

8. A display controller of a multiscan LCD as claimed in claim 6, wherein the fine adjuster circuit means includes a circuit for performing an addition or a subtraction between a fine adjustment signal supplied from an external device and an output from the memory circuit means.

9. A display control method for use with a multiscan liquid crystal display (LCD) using an LCD panel, comprising steps of:

attaining, according to a horizontal sync signal, a vertical sync signal, and a clock signal inputted thereto, a frequency mode of the horizontal frequency and a frequency mode of the vertical frequency of video signals;

referencing a look-up table according to the frequency modes and obtaining data matching a frequency inputted thereto; and variably controlling, according to the data, generation of a horizontal timing signal and a vertical timing signal determining a display position of the video signals on the LCD panel.

*10. A liquid crystal display (LCD) in which video signals of a plurality of signal standards can be displayed, wherein a display controller for said LCD comprises:*

*a pixel counter that determines a number of pixels per line of an image;*

*a line counter that determines a number of lines per image;*

*a memory that stores data corresponding to predetermined numbers of pixels and lines, which data is read out of the memory based on the number of pixels and the number of lines determined by the pixel counter and the line counter;*

*a horizontal timing signal generator and a vertical timing signal generator that set the timing by which video signals are displayed on the LCD based on data retrieved from the memory to thereby control the position of an image displayed on the LCD.*

*11. A liquid crystal display according to claim 10, wherein the pixel counter counts the number of pixels during one period of a horizontal sync signal.*

*12. The liquid crystal display according to claim 10, wherein the line counter counts the number of pulses of a horizontal sync signal during one period of a vertical sync signal.*

*13. The liquid crystal display according to claim 10, wherein the memory stores data corresponding to more than four display modes.*

*14. The liquid crystal display according to claim 10, further comprising an adder/subtracter to adjust the phase of a timing signal that determines the position of an image displayed on the LCD.*

*15. The liquid crystal display according to claim 14, further comprising an external adjusting input for receiving input data for manual adjustment of the position of an image displayed on the LCD.*

*16. A method for displaying video signals of a plurality of signal standards on a liquid crystal display (LCD), comprising:*

*counting a number of pixels per line of an image;*

*counting a number of lines per image;*

*retrieving from a memory data corresponding to predetermined numbers of pixels and lines, which data is read out of the memory based on the counted number of pixels and the counted number of lines;*

*setting the timing by which video signals are displayed on the LCD based on data retrieved from the memory to thereby control the position of an image displayed on the LCD.*

*17. The method according to claim 16, wherein the number of pixels is counted during one period of a horizontal sync signal.*

*18. The method according to claim 16, wherein the number of pulses of the horizontal sync signal is counted during one period of a vertical sync signal.*

*19. The method according to claim 16, wherein the memory stores data corresponding to more than four display modes.*

*20. The method according to claim 16, further comprising adjusting the phase of a timing signal that determines the position of an image displayed on the LCD.*

*21. The method according to claim 18, further comprising inputting data corresponding to a manual adjustment of the position of an image displayed on the LCD.*

*22. A liquid crystal display (LCD) in which video signals of a plurality of signals standards can be displayed, wherein a display controller for said LCD comprises:*

*a first counter that determines a number of first pulses appearing during a first period of time based on a horizontal sync signal;*

*a second counter that determines a number of second pulses appearing during a second period of time based on a vertical sync signal;*

*a memory that stores data corresponding to predetermined number of first and second pulses, which data is read out of the memory based on the number of first pulses and the number of second pulses determined by the first and second counters; and*

*a timing signal generator that sets the timing in horizontal and vertical directions by which video signals are displayed on the LCD in response to the data read out of the memory to thereby control the position of an image displayed on the LCD.*

*23. The liquid crystal display according to claim 22, wherein a clock signal is used as the first pulses and said horizontal sync signal is used as the second pulses.*

*24. A method for displaying video signals of a plurality of signal standards on a liquid crystal display (LCD), comprising:*

*counting first pulses during a first period of time based on a horizontal sync signal;*

*counting second pulses during a second period of time based on a vertical sync signal;*

*retrieving from a memory data corresponding to predetermined numbers of first and second pulses, which data is based on the counted numbers of the first and second pulses; and*

*setting the timing by which video signals are displayed on the LCD based on the data retrieved from the memory to thereby control the position of an image displayed on the LCD.*

*25. The method according to claim 24, wherein a clock signal is used as the first pulses and the horizontal sync signal is used the second pulses.*

* * * * *